United States Patent
Isaac

(10) Patent No.: US 12,424,032 B2
(45) Date of Patent: Sep. 23, 2025

(54) PROCESSING SYSTEM FOR DYNAMIC COLLISION VERIFICATION AND SENSOR SELECTION

(71) Applicant: Allstate Insurance Company, Northbrook, IL (US)

(72) Inventor: Emad S. Isaac, Downers Grove, IL (US)

(73) Assignee: Allstate Insurance Co., Northbrook, IL (US)

( * ) Notice: Subject to any disclaimer, the term of this patent is extended or adjusted under 35 U.S.C. 154(b) by 307 days.

(21) Appl. No.: 16/667,210

(22) Filed: Oct. 29, 2019

(65) Prior Publication Data

US 2021/0125423 A1    Apr. 29, 2021

(51) Int. Cl.
*G07C 5/00* (2006.01)
*G06N 20/00* (2019.01)
(Continued)

(52) U.S. Cl.
CPC .............. *G07C 5/008* (2013.01); *G06N 20/00* (2019.01); *G07C 5/0841* (2013.01); *H04W 4/029* (2018.02)

(58) Field of Classification Search
CPC .... G07C 5/008; G07C 5/0841; G07C 5/0825; G07C 5/0808; G06N 20/00; H04W 4/029
See application file for complete search history.

(56) References Cited

U.S. PATENT DOCUMENTS 7,102,496 B1    9/2006 Ernst, Jr. et al.
7,283,904 B2    10/2007 Benjamin et al.
(Continued)

FOREIGN PATENT DOCUMENTS

CN    102303605 A    1/2012
CN    102673561 B    11/2015
(Continued)

OTHER PUBLICATIONS

Gunjan S. Sant "Study of Sensors for Automobile Safety with Automated Road Transport: a Review" International Conference on Ideas, Impact and Innovation in Mechanical Engineering (ICIIIME 2017) vol. 5 Issue 6 https://jritcc.org/download/conferences/ICIIIME_2017/ICIIIME_2017_Track/1497426332_14-Jun. 2017.pdf website visited Oct. 29, 2019, pp. 1-5.
(Continued)

*Primary Examiner* — Abby J Flynn
*Assistant Examiner* — Paulo Roberto Gonzalez Leite
(74) *Attorney, Agent, or Firm* — Akerman LLP

(57) ABSTRACT

Aspects of the disclosure relate to computing platforms that utilize improved techniques for dynamic event verification and sensor selection. A computing platform may determine accuracy for each of a plurality of sensor devices for each of a plurality of data types. For each of the data types, the computing platform may rank the plurality of sensor devices based on their corresponding accuracy. The computing platform may direct a first sensor device and a second sensor device to provide first and second source data respectively. These sensor devices may be the most accurate sources of data types corresponding to the first and second source data respectively. The computing platform may receive the first source data and the second source data. Based on the first source data and the second source data, the computing platform may generate an event output indicating whether a vehicle experienced an event.

20 Claims, 13 Drawing Sheets

(51) Int. Cl.
  *G07C 5/08*   (2006.01)
  *H04W 4/029*  (2018.01)

(56) References Cited

U.S. PATENT DOCUMENTS

| | | |
|---|---|---|
| 7,284,769 B2 | 10/2007 | Breed |
| 7,532,196 B2 | 5/2009 | Hinckley |
| 8,010,256 B2 | 8/2011 | Oowada |
| 8,781,669 B1 | 7/2014 | Teller et al. |
| 9,043,130 B2 | 5/2015 | Ricci |
| 9,165,469 B2 | 10/2015 | Bowers et al. |
| 9,275,093 B2 | 3/2016 | Pandey et al. |
| 9,412,273 B2 | 8/2016 | Ricci |
| 9,701,307 B1 | 7/2017 | Newman et al. |
| 9,720,418 B2 | 8/2017 | Stenneth |
| 10,127,810 B2 | 11/2018 | Durie, Jr. et al. |
| 10,163,350 B1 | 12/2018 | Fields et al. |
| 10,360,742 B1* | 7/2019 | Bellas .................... G07C 5/008 |
| 2002/0105423 A1 | 8/2002 | Rast |
| 2004/0036261 A1* | 2/2004 | Breed ................ B60C 23/0408 |
| | | 280/735 |
| 2010/0250021 A1* | 9/2010 | Cook .................... G07C 5/008 |
| | | 701/1 |
| 2012/0197852 A1 | 8/2012 | Dutta et al. |
| 2014/0163768 A1 | 6/2014 | Purdy et al. |
| 2017/0131716 A1* | 5/2017 | Brekke ................ G01C 21/20 |
| 2017/0164158 A1 | 6/2017 | Watkins et al. |
| 2018/0033220 A1* | 2/2018 | Pal ........................ H04W 4/027 |
| 2019/0054858 A1 | 2/2019 | Pedersen |

FOREIGN PATENT DOCUMENTS

| | | |
|---|---|---|
| CN | 107609522 A | 1/2018 |
| KR | 101912453 B1 | 10/2018 |
| WO | 2018225067 A1 | 12/2018 |

OTHER PUBLICATIONS

Nikos Floudas "Track Based Multi Sensor Data Fusion for Collison Mitigation" Fusion http://fusion.isif.org/proceedings/fusion08CD/papers/1569105871.pdf? website visited Oct. 29, 2019, pp. 1-8.

Raja Sekhar Rao Dheekonda et al. "Object Detection from a Vehicle using Deep Learning Network and Future Integration with Multi-Sensor Fusion Algorithm" SAE International 2017, https://scholarworks.iupui.edu/bitstream/handle/1805/14903/Dheekonda_2017_object.pdf?sequence=1 website visited Oct. 29, 2019, pp. 1-8.

Varuna De Silva "Fusion of LiDAR and Camera Sensor Data for Environment Sensing in Driverless Vehicles" IEEE Sensors Journal https://www.semanticscholar.org/paper/Fusion-of-LiDAR-and-Camera-Sensor-Data-for-Sensing-Silva-Roche/01a0454ac87119ed09542d31bd94b506ff447e45 website visited Oct. 29, 2019, pp. 1-8.

Jan. 22, 2021—(WO) International Search Report & Written Opinion—PCT/US20/57349.

* cited by examiner

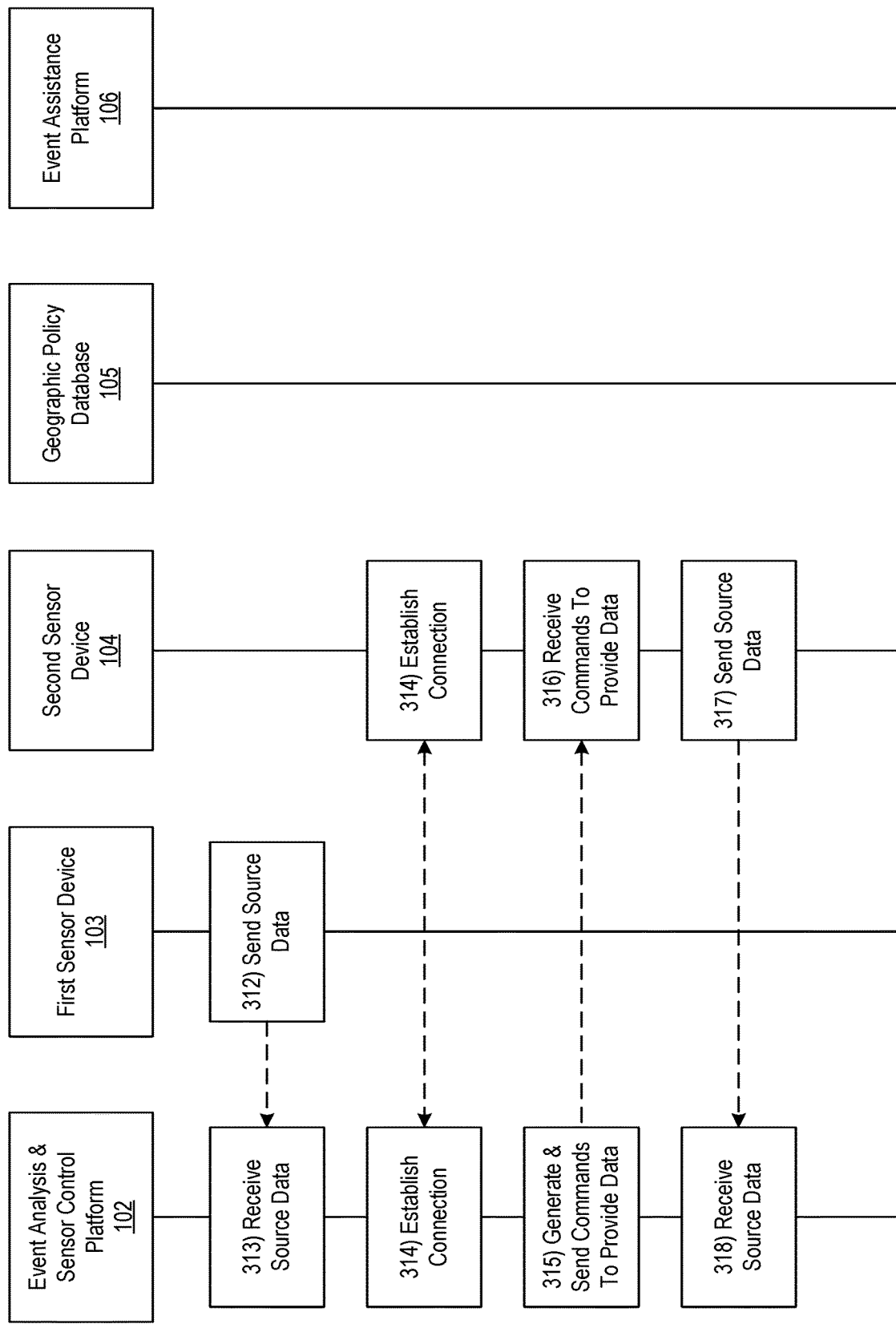

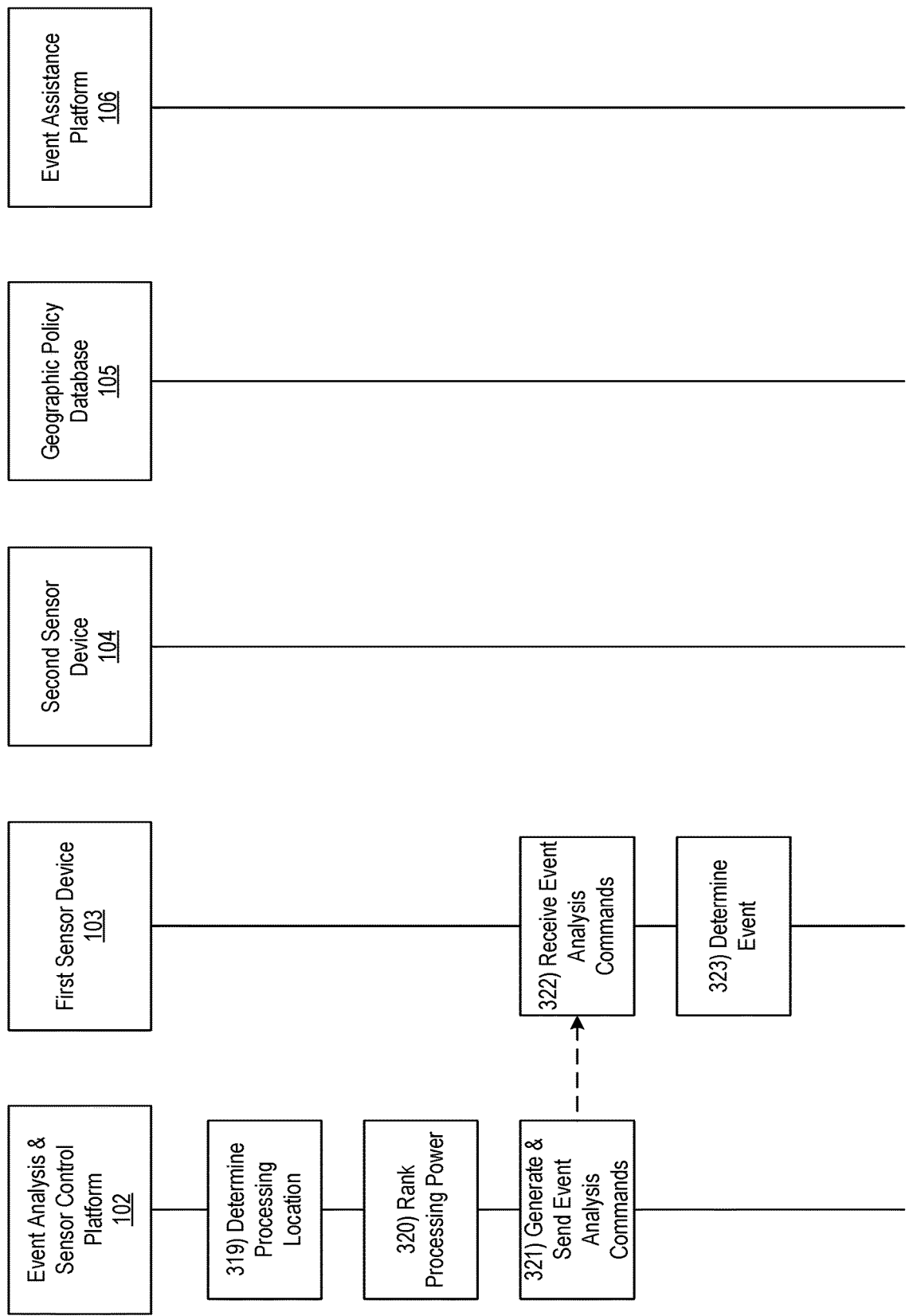

605

Event Management Interface

Warning: vehicles slowing ahead. Slow down.

| Confirm. | Not this time. |

Event Management Interface

Collision detected. Please confirm:

| Yes, I experienced a collision. | No collision occurred. |

FIG. 7

PROCESSING SYSTEM FOR DYNAMIC COLLISION VERIFICATION AND SENSOR SELECTION

BACKGROUND

Aspects of the disclosure relate to enhanced processing systems for performing dynamic event verification and sensor selection. Many organizations and individuals rely on sensor data to determine whether an event occurred. In many instances, however, data used to determine whether an event occurred, or the determinations themselves may be inaccurate. There remains an ever-present need to develop improved methods of verifying whether an event occurred using sensor data.

SUMMARY

Aspects of the disclosure provide effective, efficient, scalable, and convenient technical solutions that address and overcome the technical problems associated with event verification and sensor selection. In accordance with one or more arrangements discussed herein, a computing platform having at least one processor, a communication interface, and memory may access a sensor capability database to determine an accuracy output associated with each of a plurality of sensor devices for each of a plurality of data types. For each of the data types and based on their accuracy outputs, the computing platform may rank the plurality of sensor devices, resulting in a ranked list of the plurality of sensor devices. The computing platform may send one or more commands directing a first sensor device to provide first source data and directing a second sensor device to provide second source data. The first sensor device may be ranked highest on the ranked list of the plurality of sensor devices for a data type corresponding to the first source data and the second sensor device may be ranked highest on the ranked list of the plurality of sensor devices for a data type corresponding to the second source data. The computing platform may receive, from the first sensor device and the second sensor device respectively, the first source data and the second source data. Based on the first source data and the second source data, the computing platform may generate an event output indicating whether a vehicle associated with the first source data and the second source data experienced an event.

In some examples, the computing platform may establish a wireless connection with a geographic policy database. While the wireless connection is established and after ranking the plurality of sensor devices, the computing platform may send one or more commands directing the geographic policy database to provide an indication of whether use of the first sensor device complies with geographic policies. While the wireless connection is established, the computing platform may receive the indication of whether use of the first sensor device complies with geographic policies.

In some arrangements, sending the one or more commands directing the first sensor device to provide first source data may be in response to determining, based on the indication of whether the use of the first sensor device complies with geographic policies, that the first sensor device complies with geographic policies.

In some examples, while the wireless connection is established and after ranking the plurality of sensor devices, the computing platform may send one or more commands directing the geographic policy database to provide an indication of whether use of a third sensor device complies with geographic policies. The third sensor device may be ranked highest on the ranked list of the plurality of sensor devices for a data type corresponding to third source data. While the wireless connection is established, the computing platform may receive the indication of whether use of the third sensor device complies with geographic policies. Based on the indication of whether use of the third sensor device complies with geographic policies, the computing platform may determine that the third sensor device is non-compliant with the geographic policies. After determining that the third sensor device is non-compliant with the geographic policies, the computing platform may send one or more commands directing the geographic policy database to provide an indication of whether use of a fourth sensor device complies with geographic policies. The fourth sensor device may be ranked second highest on the ranked list of the plurality of sensor devices for the data type corresponding to the third source data. In response to determining, based on the indication of whether the use of the third sensor device complies with geographic policies, that the third sensor device complies with geographic policies, the computing platform may send one or more commands directing the fourth sensor device to provide the third source data.

In some arrangements, the computing platform may determine that event analysis should occur locally at one of the plurality of sensor devices. The computing platform may rank the plurality of sensor devices based on available processing power at each of the plurality of sensor devices, resulting in a ranked list of sensor devices by processing power. The computing platform may send one or more commands to the first sensor device directing the first sensor device to determine the event output. The first sensor device may be the highest ranked device on the ranked list of sensor devices by processing power.

In some examples, the computing platform may determine that event analysis should occur at the computing platform. In some examples, determining the event output may be in response to determining that the event analysis should occur at the computing platform.

In some arrangements, determining the event output may comprise determining, using one or more machine learning algorithms and one or more machine learning datasets, an indication of whether the vehicle experienced an event. In some arrangements, the computing platform may establish a wireless connection with an event assistance platform. While the wireless connection is established and to the event assistance platform, the computing platform may send the event output and one or more commands directing the event assistance platform to cause display of the event output.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3E depict an illustrative event sequence for deploying computing platforms that utilize improved sensor selection techniques in accordance with one or more example arrangements discussed herein;

FIGS. 6 and 7 depict illustrative user interfaces for computing platforms that utilize improved event verification and sensor selection techniques in accordance with one or more example arrangements discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the present disclosure provides systems and methods for increasing accuracy of event determinations and selecting sensors for data collection based on their capabilities. In one or more instances, the events may include a collision, sudden movement, harsh breaking, rollover, or the like. In one or more instances, sensor devices may effectively peer across to confirm determinations and/or source data with another sensor device. In these instances, the sensor devices may communicate via a central event analysis platform or they may communicate directly with each other. In doing so, the sensor devices may provide verified source data and/or determinations of whether an event occurred, which may be more accurate than instances in which the sensor devices did not communicate. Additionally or alternatively, source data may be collected from multiple different sensors and used in an overall determination of whether a vehicle experienced an event. Certain sensors may be more accurate at determining particular types of data than others. Accordingly, by selecting particular sensors to provide a particular type of data, accuracy of the data collection may be maximized. By obtaining the most accurate source data, more accurate determinations of whether or not a vehicle experienced an event may occur. Accordingly, by applying the methods described herein, determination of whether or not a vehicle experienced an event, using source data from various sensor devices, may be improved. This may reduce an amount of false determinations of whether a vehicle was or was not involved in an event, which may conserve resources by not responding to false positive determinations and may improve driving safety by ensuring that responders are notified and dispatched when an event actually occurs (e.g., rather than being informed of a false negative determination). These and various other arrangements will be described more fully herein.

Figure 1A:
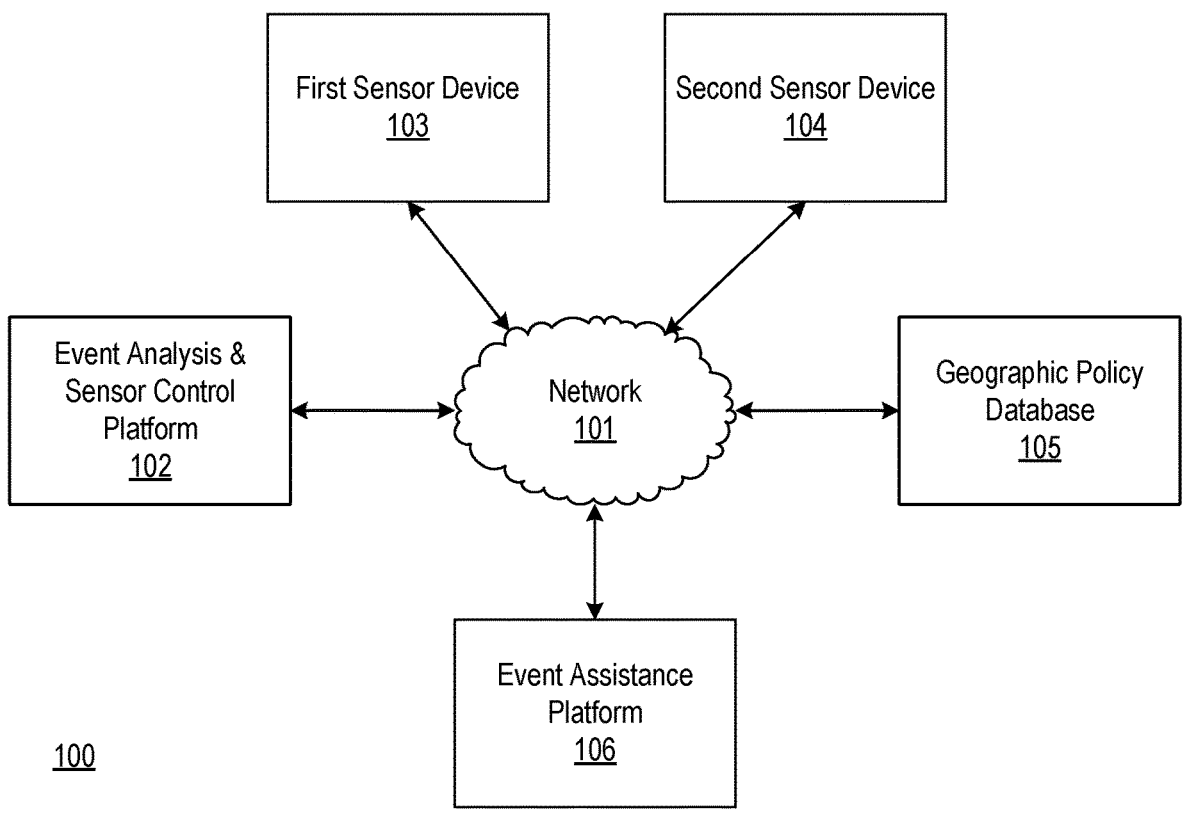
FIGS. 1A-1B depict an illustrative computing environment for deploying computing platforms that utilize improved event verification and sensor selection techniques in accordance with one or more example arrangements discussed herein.
Figure 1B:
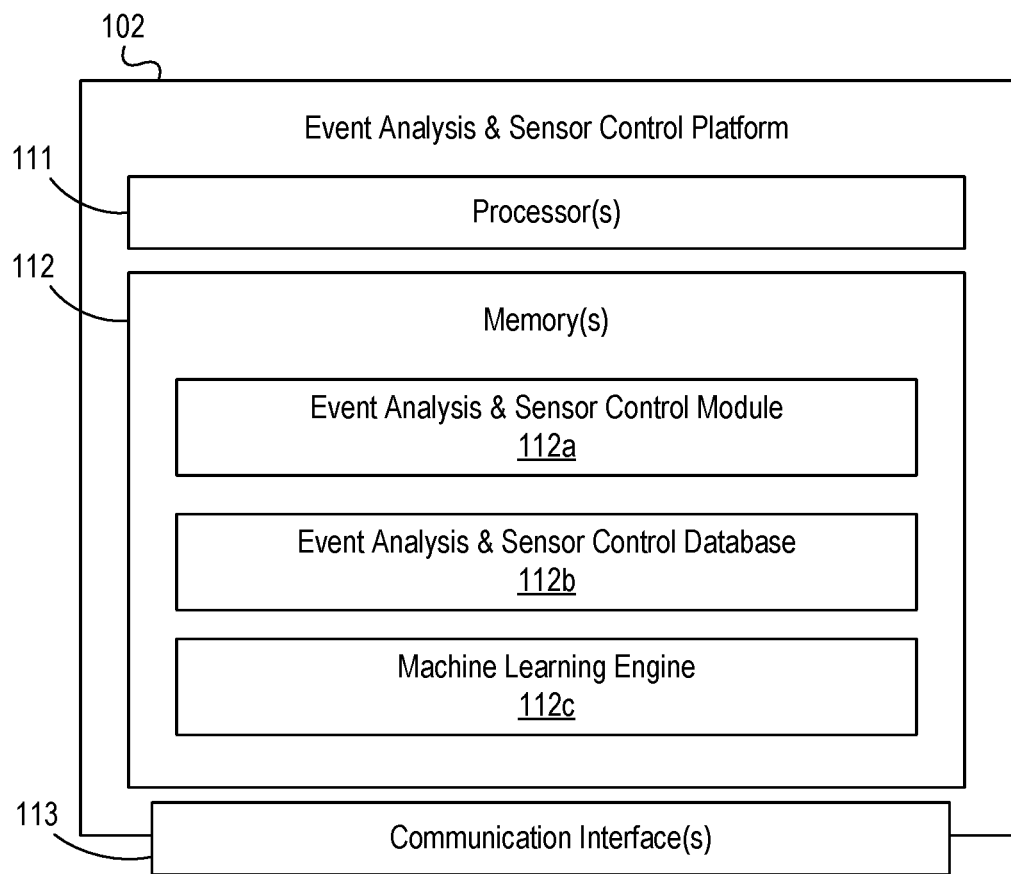

FIGS. 1A and 1B depict an illustrative computing environment for performing advanced dynamic event verification and sensor selection in accordance with one or more example embodiments. Referring to FIG. 1A, computing environment 100 may include one or more computer systems. For example, computing environment 100 may include event analysis and sensor control platform 102, first sensor device 103, second sensor device 104, geographic policy database 105, and event assistance platform 106.

As illustrated in greater detail below, event analysis and sensor control platform 102 may include one or more computing devices configured to perform one or more of the functions described herein. For example, event analysis and sensor control platform 102 may include one or more computers (e.g., laptop computers, desktop computers, servers, server blades, or the like). In one or more instances, event analysis and sensor control platform 102 may be configured to receive data captured by the sensor devices 103 and 104 and analyze the data to determine whether a vehicle experienced an event. In one or more instances, the event analysis and sensor control platform 102 may also be configured to determine a most accurate data source for particular data types, collect source data from these different sources, and determine, based on a combination of the source data from different sources, whether a vehicle experienced an event.

As illustrated in greater detail below, the event analysis and sensor control platform 102 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by event analysis and sensor control platform 102 may be associated with an external portal provided by an organization, such as event management interfaces that provide warnings and/or prompt users to confirm whether an event occurred.

First sensor device 103 may be a computing device configured to collect and send data for further analysis. In some instances, first sensor device 103 may be a personal computing device (e.g., smartphone, laptop computer, desktop computer, tablet computer, or the like) that is capable of receiving commands and generating user interfaces accordingly. In addition, first sensor device 102 may include one or more cameras and/or sensors (e.g., motion sensors, global positioning sensors, temperature sensors, microphones or the like) that may be used to capture data corresponding to a driving trip. In some instances, the first sensor device 103 may be configured to send this data upon request or at predetermined intervals for analysis. Additionally or alternatively, the first sensor device 103 may be a vehicle sensor (e.g., speedometer, accelerometer, break detection systems, impact sensors, airbag deployment sensors, cameras, or the like). In one or more instances, the first sensor device 103 may be configured to request confirmation source data from a second sensor device (e.g., second sensor device 104). Additionally or alternatively, the first sensor device 103 may be configured to send the source data to the event analysis and sensor control platform 102, which may request the confirmation source data. In one or more instances, the first sensor device 103 may be configured to analyze determined and/or received source data to determine whether an event occurred.

Second sensor device 104 may be a computing device configured to collect and send data for further analysis. In some instances, second sensor device 104 may be a personal computing device (e.g., smartphone, laptop computer, desktop computer, tablet computer, or the like) that is capable of receiving commands and generating user interfaces accordingly. In addition, second sensor device 104 may include one or more cameras and/or sensors (e.g., motion sensors, global positioning sensors, temperature sensors, microphones or the like) that may be used to capture data corresponding to a driving trip. In some instances, the second sensor device 104 may be configured to send this data upon request or at predetermined intervals for analysis. Additionally or alternatively, the second sensor device 104 may be a vehicle sensor (e.g., speedometer, accelerometer, break detection systems, impact sensors, airbag deployment sensors, cameras, or the like). In one or more instances, the second sensor device may be configured to request confirmation source data from another sensor device (e.g., first sensor device 103). Additionally or alternatively, the second sensor device 104 may be configured to send the source data to the event analysis and sensor control platform 102, which may request the confirmation source data. In one or more instances, the second sensor device 104 may be configured to analyze determined and/or received source data to determine whether an event occurred.

Geographic policy database 105 may be a computing platform capable of storing and maintaining various information corresponding to one or more sensor use policies. For example, the geographic policy database 105 may contain data corresponding to which sensors may legally collect data in various geographic regions (e.g., different states, countries, or the like). In these instances, the data may be collected after receiving appropriate permissions from a user. In one or more instances, the geographic policy database 105 may be configured to receive requests for whether particular sensor devices (e.g., first sensor device 103, second sensor device 104, or the like) are compliant with data collection policies in a particular region. The geographic policy database 105 may determine whether the requested sensor devices are compliant, and may generate/send an indication to the event analysis and sensor control platform 102 indicating whether or not the requested sensor devices are compliant.

Event assistance platform 106 may be a computing device (e.g., a desktop computer, laptop computer, tablet computer, smart phone, or the like) that may be used to receive event indications and generate user interfaces and/or dispatch requests accordingly. For example, the event assistance platform 106 may receive an indication of an event and may generate user interfaces to indicate details of the event to an employee of an institution. Additionally or alternatively, the event assistance platform 106 may automatically generate a dispatch request to send assistance to the location of the event.

Computing environment 100 also may include one or more networks, which may interconnect one or more of event analysis and sensor control platform 102, first sensor device 103, second sensor device 104, geographic policy database 105, and event assistance platform 106. For example, computing environment 100 may include a network 101 (which may, e.g., interconnect event analysis and sensor control platform 102, first sensor device 103, second sensor device 104, geographic policy database 105, and event assistance platform 106).

In one or more arrangements, event analysis and sensor control platform 102, first sensor device 103, second sensor device 104, geographic policy database 105, event assistance platform 106, and/or the other systems included in computing environment 100 may be any type of computing device capable of receiving a user interface, receiving input using the user interface, and communicating the received input to one or more other computing devices. For example, event analysis and sensor control platform 102, first sensor device 103, second sensor device 104, geographic policy database 105, event assistance platform 106, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of event analysis and sensor control platform 102, first sensor device 103, second sensor device 104, geographic policy database 105, and event assistance platform 106 may, in some instances, be special-purpose computing devices configured to perform specific functions.

Referring to FIG. 1B, event analysis and sensor control platform 102 may include one or more processors 111, memory 112, and communication interface 113. A data bus may interconnect processor 111, memory 112, and communication interface 113. Communication interface 113 may be a network interface configured to support communication between mitigation analysis and output generation platform 103 and one or more networks (e.g., network 101, or the like). Memory 112 may include one or more program modules having instructions that when executed by processor 111 cause event analysis and sensor control platform 102 to perform one or more functions described herein and/or one or more databases that may store and/or otherwise maintain information which may be used by such program modules and/or processor 111. In some instances, the one or more program modules and/or databases may be stored by and/or maintained in different memory units of event analysis and sensor control platform 102 and/or by different computing devices that may form and/or otherwise make up event analysis and sensor control platform 102. For example, memory 112 may have, store, and/or include an event analysis and sensor control module 112a, an event analysis and sensor control database 112b, and a machine learning engine 112c. Event analysis and sensor control module 112a may have instructions that direct and/or cause event analysis and sensor control platform 102 to execute advanced event analysis and sensor control techniques, as discussed in greater detail below. Event analysis and sensor control database 112b may store information used by event analysis and sensor control module 112a and/or event analysis and sensor control platform 102 in event analysis, sensor selection, sensor control, and/or in performing other functions. Machine learning engine 112c may have instructions that direct and/or cause the event analysis and sensor control platform 102 to perform event analysis, sensor selection, and sensor control, and to set, define, and/or iteratively refine optimization rules and/or other parameters used by the event analysis and sensor control platform 102 and/or other systems in computing environment 100.

Figure 2A:
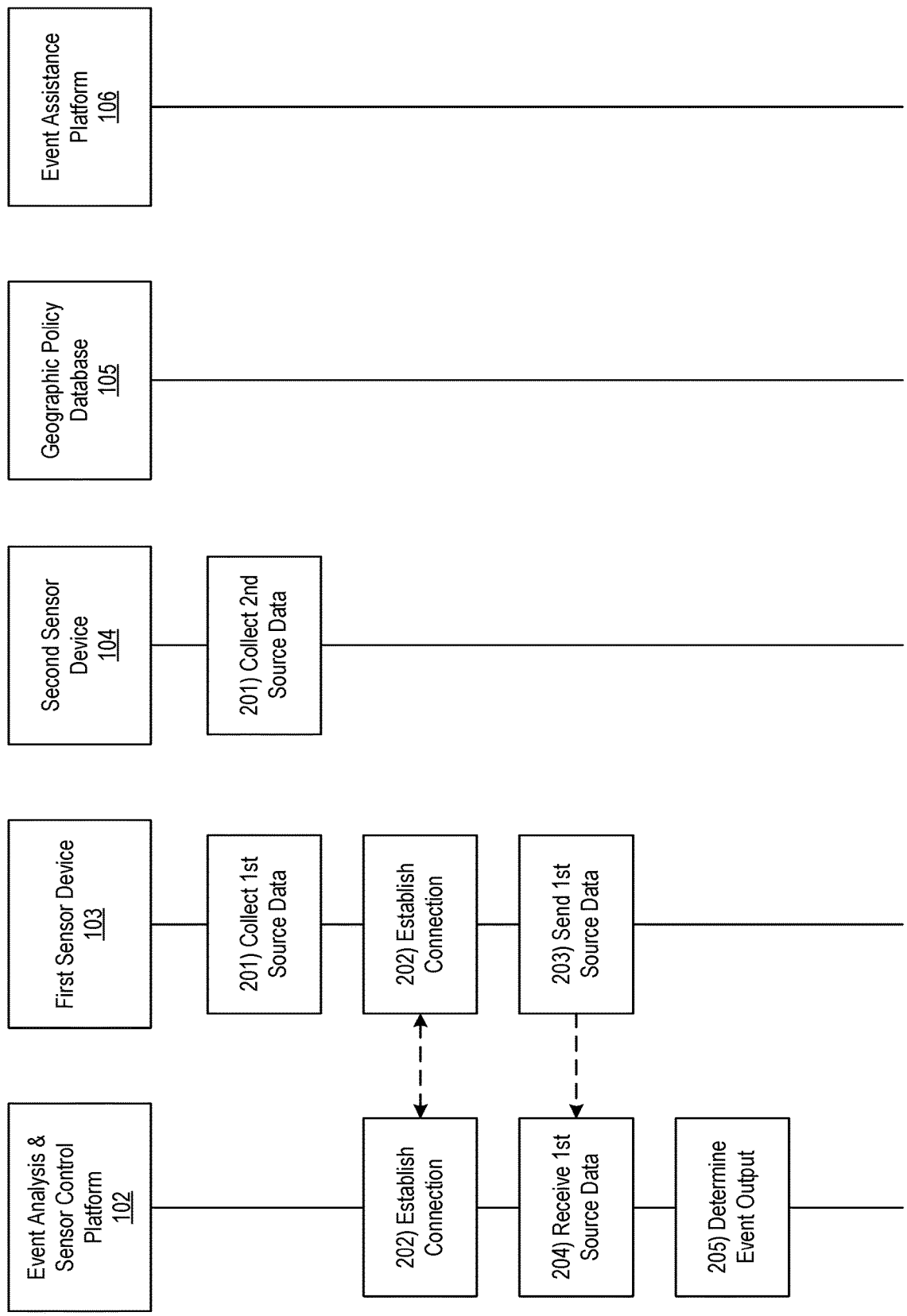
FIGS. 2A-2C depict an illustrative event sequence for deploying computing platforms that utilize improved event verification techniques in accordance with one or more example arrangements discussed herein.
Figure 2B:
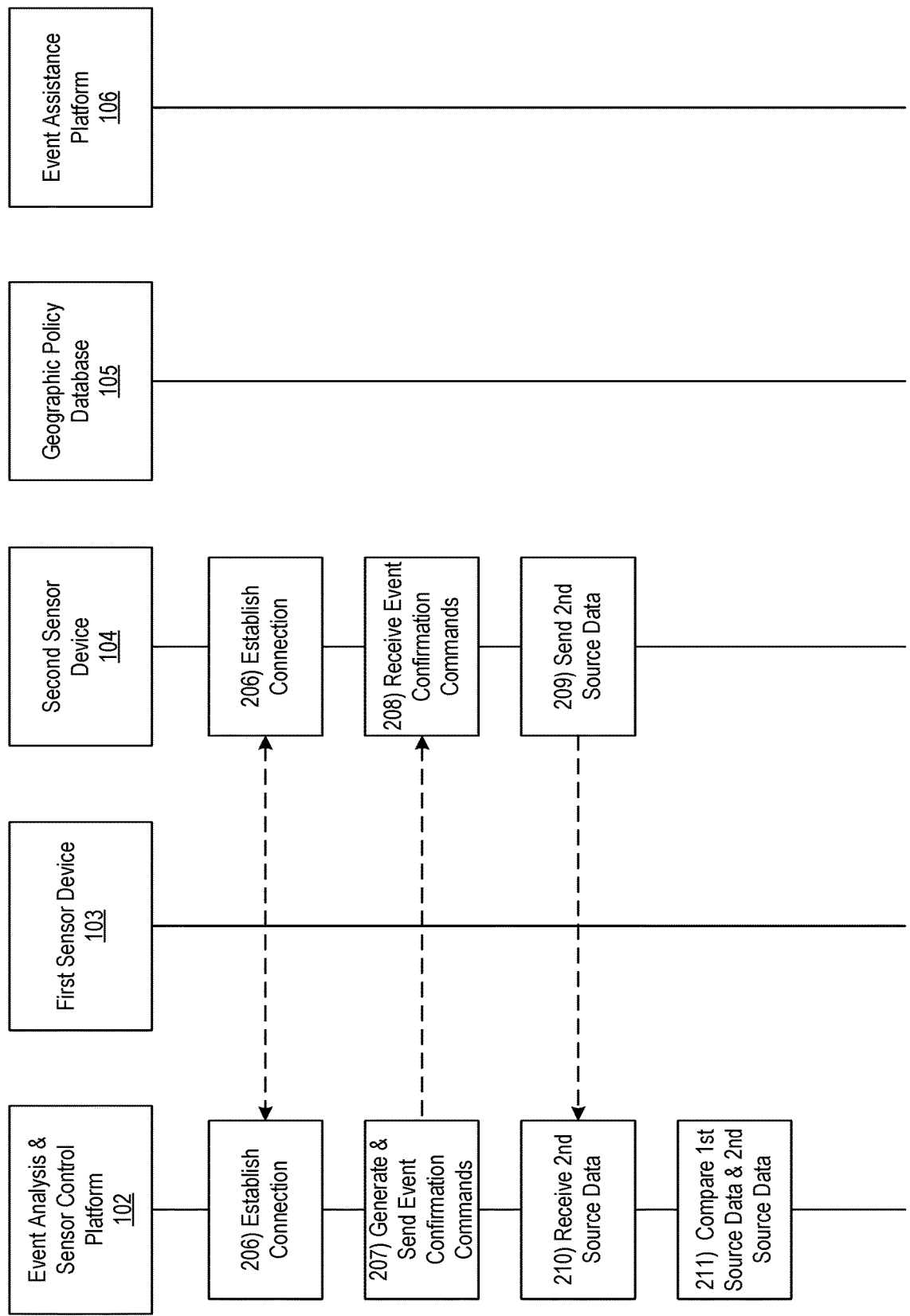
Figure 2C:
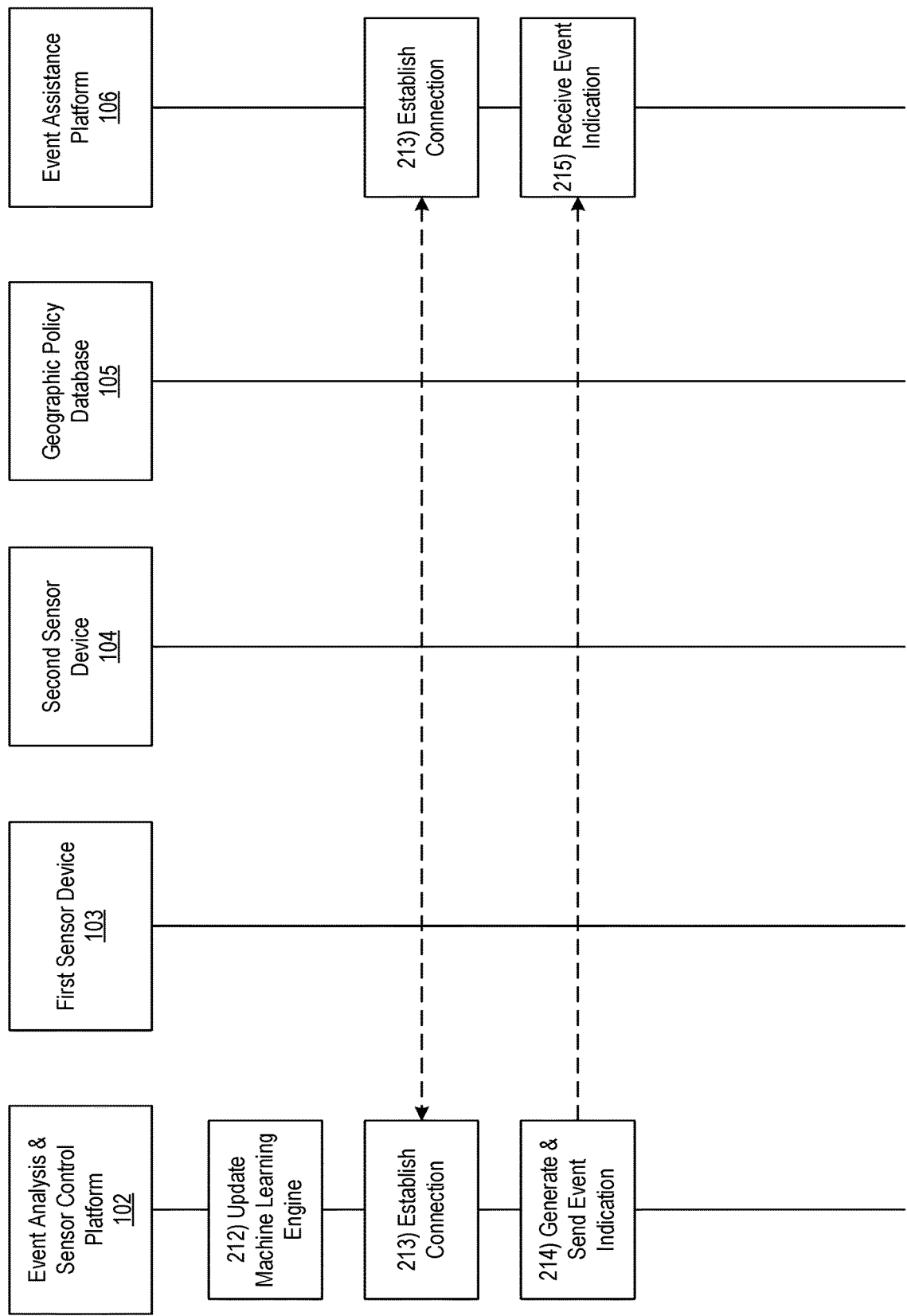

FIGS. 2A-2C depict an illustrative event sequence for deploying an event analysis and sensor control platform 103 that uses advanced techniques to perform event analysis and sensor selection in accordance with one or more example embodiments. Referring to FIG. 2A, at step 201, the first sensor device 103 and the second sensor device 104 may collect source data. In one or more instances, in collecting source data, the first sensor device 103 and the second sensor device 104 may collect telematics data (e.g., speed, acceleration, location, deceleration, stopping, turning, swerving, impact, or the like). Additionally or alternatively, in collecting source data the first sensor device 103 and the second sensor device 104 may collect non-telematics data (e.g., pictures, video, cell phone usage, audio, or the like). In one or more instances, in collecting the source data, the first sensor device 103 and the second sensor device 104 may collect source data over a predetermined time period. In these instances, the predetermined time period may be configurable by a user.

At step 202, the first sensor device 103 may establish a connection with the event analysis and sensor control platform 102. In one or more instances, the first sensor device 103 may establish a first wireless data connection with the event analysis and sensor control platform 102 to link the first sensor device 102 to the event analysis and sensor control platform.

At step 203, the first sensor device 103 may send source data, collected at step 201 by the first sensor device 103, to the event analysis and sensor control platform 102. In one or more instances, the first sensor device 103 may send the source data to the event analysis and sensor control platform 102 while the first wireless data connection is established. In some instances, the first sensor device 103 may send the source data to the event analysis and sensor control platform 102 at a predetermined interval. Additionally, or alternatively, the first sensor device 103 may send the source data to the event analysis and sensor control platform 102 if the source data exceeds a predetermined threshold (e.g., impact detected that exceeds a predetermined threshold). Additionally or alternatively, the first sensor device 103 may send the source data to the event analysis and sensor control platform 102 in response to one or more commands from the event analysis and sensor control platform 102 directing the first sensor device to send the source data.

In one or more instances, in addition to or as an alternative to communicating the source data to the event analysis and sensor control platform 102, the first sensor device 103 may directly communicate with the second sensor device 104. In these instances, the event analysis and sensor control platform 102 may send one or more commands to the second sensor device 104 directing the second sensor device 104 to confirm the source data. In these instances, the event analysis and sensor control platform 102 may send the source data along with the one or more commands directing the second sensor device 104 to confirm the source data.

In one or more instances, in addition to or as an alternative to sending the source data to the event analysis and sensor control platform 102 and/or the second sensor device 104, the first sensor device 103 may determine, using one or more machine learning algorithms and datasets, whether the source data is indicative of an event. For example, the first sensor device 103 may compare the source data to one or more event thresholds (e.g., impact exceeded a predetermined threshold, or the like) to determine an event output indicating whether a vehicle likely experienced an event. In these instances, the first sensor device 103 may send the event output to the event analysis and sensor control platform 102 and/or second sensor device 104.

At step 204, the event analysis and sensor control platform 102 may receive the source data sent at step 203. In one or more instances, in receiving the source data, the event analysis and sensor control platform 102 may receive the source data while the first wireless data connection is established and via the communication interface 113. In one or more instances, in addition to or as an alternative to, receiving the source data, the event analysis and sensor control platform 102 may receive an event output from the first sensor device 103 indicating whether the vehicle was believed to be in an event.

In one or more instances, the source data received at step 204 might not indicate an event, but may indicate information to prevent an event for the vehicle and/or other surrounding vehicles. For example, in one or more instances, the source data may indicate that the vehicle is severely braking. In these instances, the event analysis and sensor control platform 102 may generate and send event management interface information to mobile devices within a predefined distance alerting them of the braking and prompting the mobile devices to generate an event management interface in response. In one or more instances, the mobile device may generate an event management interface similar to graphical user interface 605, which is shown in FIG. 6. For example, the mobile device may indicate that vehicles are slowing ahead and that a driver should slow down preemptively. In these instances, the mobile device may be located in a different vehicle than the first data source.

At step 205, the event analysis and sensor control platform 102 may determine an event output. For example, the event analysis and sensor control platform 102 may determine, using one or more machine learning algorithms and datasets, whether the source data is indicative of an event. For example, the event analysis and sensor control platform 102 may compare the source data to one or more event thresholds (e.g., impact exceeded a predetermined threshold, or the like) to determine an event output indicating whether a vehicle likely experienced an event.

In one or more instances, the event analysis and sensor control platform 102 may have received the event output from the first sensor device at step 104. In these instances, the event analysis and sensor control platform 102 might not determine the event output.

Referring to FIG. 2B, at step 206, the event analysis and sensor control platform 102 may establish a connection with the second sensor device 104. In one or more instances, the second sensor device 104 may be located in the same vehicle as the first sensor device 103. In other instances, the second sensor device 104 may be located in a different vehicle than the first sensor device 103. In one or more instances, the event analysis and sensor control platform 102 may establish a second wireless connection with the second sensor device 104. In one or more instances, the event analysis and sensor control platform 102 may determine that a connection should be established with the second sensor device 104 as opposed to other sensor devices based on accuracy of data provided by the second sensor device 104, geographic data collection regulations, or the like. Such selection of the second sensor device 104 is described further below with regard to FIGS. 3A-3E.

At step 207, the event analysis and sensor control platform 102 may generate one or more commands directing the second sensor device 104 to confirm the event output and may send the one or more commands directing the second device 104 to confirm the event output to the second sensor device 104. In one or more instances, the event analysis and sensor control platform 102 may send the one or more commands directing the second device 104 to confirm the event output via the communication interface 113 while the second wireless data connection is established. In these instances, the event analysis and sensor control platform 102 may generate the one or more commands directing the second sensor device 104 to confirm the event output in response to determining the event output.

In one or more instances, in sending the one or more commands directing the second sensor device 104 to confirm the event output, the event analysis and sensor control platform 102 may send event management interface information, and the one or more commands directing the second sensor device 104 to confirm the event output may direct the second sensor device 104 to cause display of a user interface similar to graphical user interface 705, which is shown in FIG. 7. For example, as shown in FIG. 7, the second sensor device may generate a user interface indicating that an event was determined by the event analysis and sensor control platform 102, and asking for user input to confirm. In these instances, the second sensor device 104 may be a mobile device or other vehicle system configured to display user interfaces and receive user inputs.

At step 208, the second sensor device 104 may receive the one or more commands directing the second device 104 to confirm the event output sent at step 207. In one or more instances, the second sensor device 104 may receive the one or more commands directing the second device 104 to confirm the event output while the second wireless data connection is established. In one or more instances, rather than receiving the one or more commands directing the second device 104 to confirm the event output from the event analysis and sensor control platform 102, the second sensor device 104 may receive the one or more commands directing the second device 104 to confirm the event output directly from the first sensor device 103. In one or more instances, in addition to or as an alternative to receiving the one or more commands directing the second device 104 to confirm the event output, the second sensor device 104 may receive one or more commands directing the second sensor device 104 to confirm the source data determined by the first sensor device 103.

At step 209, the second sensor device 104 may send confirmation of the event input to the event analysis and sensor control platform 102. In one or more instances, in sending the confirmation of the event output to the event analysis and sensor control platform 102, the second sensor device 104 may send the source data determined by the second sensor device 104 at step 201. Additionally or alternatively, the second sensor device 104 may analyze the source data determined by the second sensor device 104 at step 201 to determine, using one or more machine learning algorithms and datasets, whether the vehicle likely experienced an event. In these instances, the second sensor device 104 may send an indication of whether or not the vehicle experienced an event to the event analysis and sensor control platform 102 and/or the first sensor device 103. In doing so, the first sensor device 103 may effectively peer across, either directly or through the event analysis and sensor control platform 102, to the second sensor device 104 to confirm the determined source data and/or event output. For example, the first sensor device 103 asks the second sensor device 104, "did you see what I saw?"

At step 210, the event analysis and sensor control platform 102 may receive the source data and/or confirmation of the event output from the second sensor device 104. In one or more instances, the event analysis and sensor control platform 102 may receive the source data and/or confirmation of the event output from the second sensor device 104 via the communication interface 113 and while the second wireless data connection is established. In one or more instances, in addition to or instead of the event analysis sensor control platform 102 receiving the source data and/or confirmation of the event output from the second sensor device 104, the first sensor device 103 may receive the source data and/or confirmation of the event output. In one or more instances, the source data received from the second sensor device 104 may be a different type of data than the source data received from the first sensor device 103. In other instances, the source data received from the second sensor device 104 may be the same type of data received from the first sensor device 103.

At step 211, the event analysis and sensor control platform 102 may compare the source data from the first sensor device 103 and the second sensor device 104. Additionally or alternatively, the event analysis and sensor control platform 102 may compare the event output with the confirmation of the event output from the second sensor device 104. In these instances, the event analysis and sensor control platform 102 may generate an event comparison output, which may be a numeric value representing a correlation or similarity between the source data and/or event outputs. In these instances, the event analysis and sensor control platform 102 may determine whether event comparison output exceeds a predetermined comparison threshold. If the predetermined comparison threshold is exceeded, the event analysis and sensor control platform 102 may determine that the event output initially determined was correct. If the predetermined comparison threshold is not exceeded, the event analysis and sensor control platform 102 may determine that the event output initially determined was not correct. In one or more instances, the comparison performed at step 211 may be performed by the first sensor device 103 in addition to or instead of at the event analysis and sensor control platform 102. By performing this comparison, a determination that a vehicle was or was not involved in an accident based on source data from the first sensor device 103 may be confirmed based on source data from the second sensor device 104. Additionally or alternatively, the source data from the first sensor device 103 itself may be confirmed based on the source data from the second sensor device 104.

In one or more instances, if the event comparison output does exceed the predetermined comparison threshold, the event analysis and sensor control platform 102 may send event management interface information, and one or more commands directing a user's mobile device to confirm that an event occurred. In these instances, the user may be a user corresponding to the vehicle that experienced the event. In some instances, the user might not be a user in the vehicle (e.g., a parent of a child, emergency contact, or the like). In these instances, the event analysis and sensor control platform may direct the second sensor device 104 to cause display of a user interface similar to graphical user interface 705, which is shown in FIG. 7. For example, as shown in FIG. 7, the mobile device may generate a user interface indicating that an event was determined by the event analysis and sensor control platform 102, and asking for user input to confirm.

Referring to FIG. 2C, at step 212, the event analysis and sensor control platform 102 may update the machine learning engine 112c. In one or more instances, the event analysis and sensor control platform 102 may update the machine learning engine 112c based on a determination that the event output was correct (e.g., correctly determined event/no event). In these instances, the event analysis and sensor control platform 102 may reinforce the machine learning algorithms and datasets used to determine the event output based on the source data from the first sensor device 103. In other instances, the event analysis and sensor control platform 102 may update the machine learning engine 112c based on a determination that the event output was not correct (e.g., false positive/negative). In these instances, the event analysis and sensor control platform 102 may update the machine learning algorithms and datasets used to determine the event output to reflect that an incorrect determination was made.

At step 213, the event analysis and sensor control platform 102 may establish a connection with the event assistance platform 106. In one or more instances, the event analysis and sensor control platform 102 may establish a third wireless data connection with the event assistance platform 106 to link the event analysis and sensor control platform 102 to the event assistance platform 106.

At step 214, the event analysis and sensor control platform 102 may generate and send an indication of whether an event (e.g., a collision, sudden movement, harsh breaking, rollover, or the like) occurred to the event assistance platform. In one or more instances, the event analysis and sensor control platform 102 may generate and send the indication of whether the event occurred to the event assistance platform 106 via the communication interface 113 and while the third wireless data connection is established.

At step 215, the event assistance platform 106 may receive the indication of whether the event occurred. In one or more instances, the event assistance platform 106 may generate a user interface based on the indication of whether the event occurred, alerting an employee of an institution (e.g., an insurance institution or the like) that an event occurred and that action should be taken accordingly. Additionally or alternatively, the event assistance platform 106 may automatically generate and send a dispatch notification causing a service vehicle, police, ambulance, or the like to be dispatched to a location of the event.

Subsequently the event sequence may end. It should be understood that any or the steps performed by the event analysis and sensor control platform 102 may be performed by one of the first sensor device 103 and the second sensor device 104. For example, rather than utilizing the event analysis and sensor control platform 102 to peer across to another sensor device for source data and/or event output confirmation, first sensor device 103 and second sensor device 104 may peer across to each other and communicate directly to perform such confirmation/validation. It should also be understood that although the event sequence shown herein depicts a first sensor device 103 and a second sensor device 104, any number of sensor devices may be incorporated into the event sequence.

FIGS. 3A-3E depict an illustrative event sequence for deploying an event analysis and sensor control platform 103 that uses advanced techniques to perform event analysis and sensor selection in accordance with one or more example embodiments.

Figure 3A:
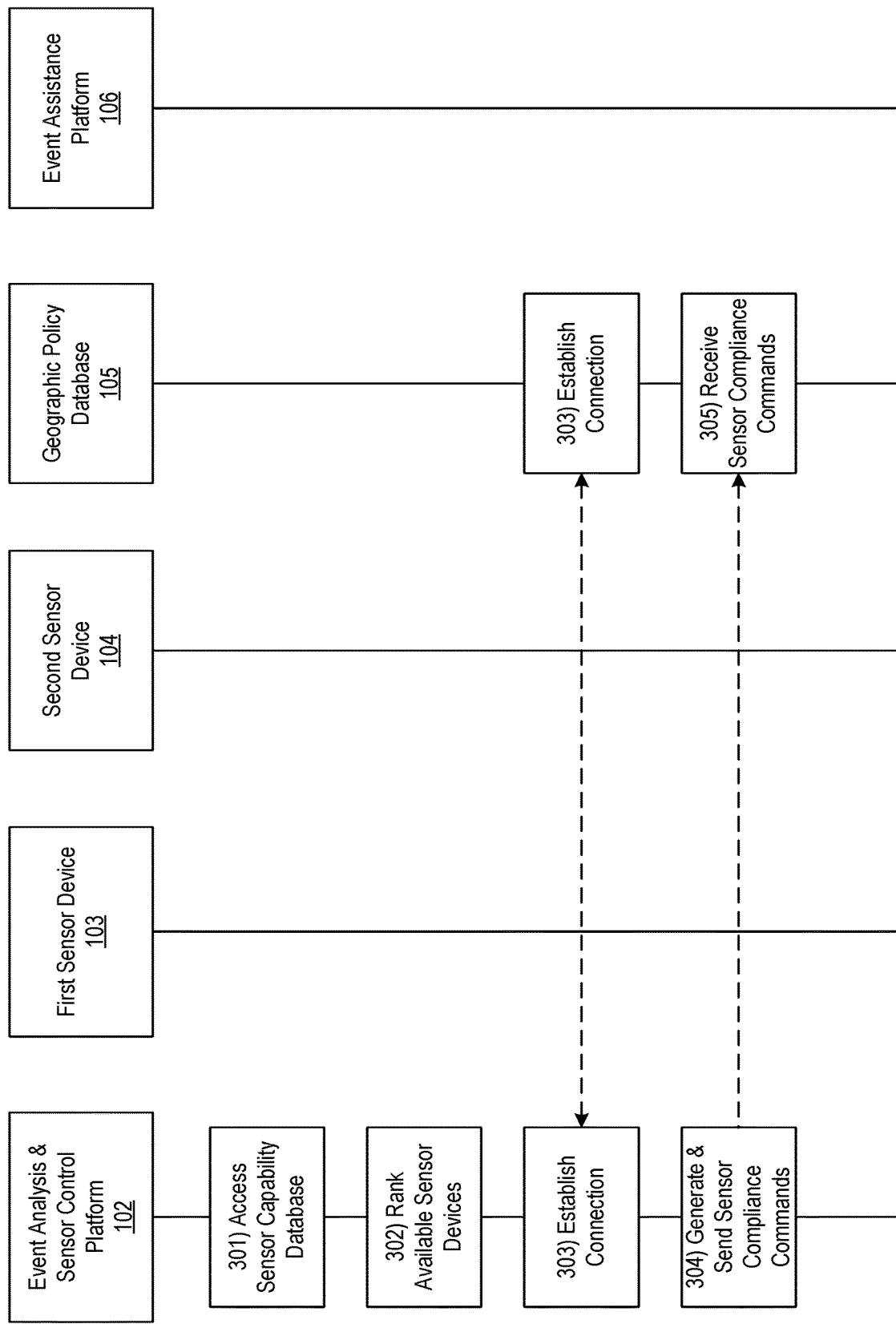

Referring to FIG. 3A, at step 301, the event analysis and sensor control platform 102 may access a sensor capability database. In one or more instances, in accessing the sensor capability database, the event analysis and sensor control platform 102 may determine a plurality of available sensor devices and may determine a plurality of accuracy outputs, each corresponding to a particular sensor devices ability to accurately collect a particular type of sensor data (e.g., a first score for acceleration accuracy, a second score for breaking detection accuracy, or the like). In these instances, the sensor capability database may include a manifest and/or configuration that describes capabilities of the various available sensor devices and potential scenarios in which a subset of the plurality of available sensor devices may be used to determine particular types of data under varied conditions.

At step 302, the event analysis and sensor control platform 102 may rank the available sensor devices, determined at step 301, based on their corresponding accuracy outputs for each type of source data. For example, the event analysis and sensor control platform 102 may generate a first ranked list of available sensor devices based on their accuracy outputs associated with acceleration data collection and a second ranked list of available sensor devices based on their accuracy outputs associated with breaking detection data collection. In one or more instances, in ranking the available sensor devices, the event analysis and sensor control platform 102 may determine which of the available sensor devices most accurately determines each type of data. For example, the event analysis and sensor control platform 102 may determine that the first sensor device 103 may provide the most accurate acceleration data, whereas the second sensor device 104 may provide the most accurate breaking detection data.

At step 303, the event analysis and sensor control platform 102 may establish a connection with the geographic policy database 105. In one or more instances, in establishing the connection with the geographic policy database 105, the event analysis and sensor control platform 102 may establish a first wireless data connection with the geographic policy database 105 to link the event analysis and sensor control platform 102 to the geographic policy database 105.

At step 304, the event analysis and sensor control platform 102 may generate and send one or commands directing the geographic policy database 105 to determine whether the most accurate sensor device for a particular type of data, as determined in step 302, complies with geographic policies regarding sensor data collection in particular geographic region. For example, use of particular sensors may be permitted in some geographic regions but not others, and the event analysis and sensor control platform 102 may verify whether the most accurate sensor device for the particular type of data complies with such policies prior to directing the most accurate sensor device to collect source data. In one or more instances, the event analysis and sensor control platform may send the one or more commands directing the geographic policy database 105 to determine whether sensor devices comply with the geographic policies via the communication interface 113 and while the first wireless data connection is established. As an example, the event analysis and sensor control platform 102 may direct the geographic policy database 105 to determine whether the first sensor device 103 is compliant with geographic policy.

At step 305, the geographic policy database 105 may receive the one or more commands directing the geographic policy database 105 to determine whether the sensor devices comply with the geographic policies. In one or more instances, the geographic policy database 105 may receive the one or more commands directing the geographic policy database 105 to determine whether the sensor devices comply with the geographic policies while the first wireless data connection is established.

Figure 3B:
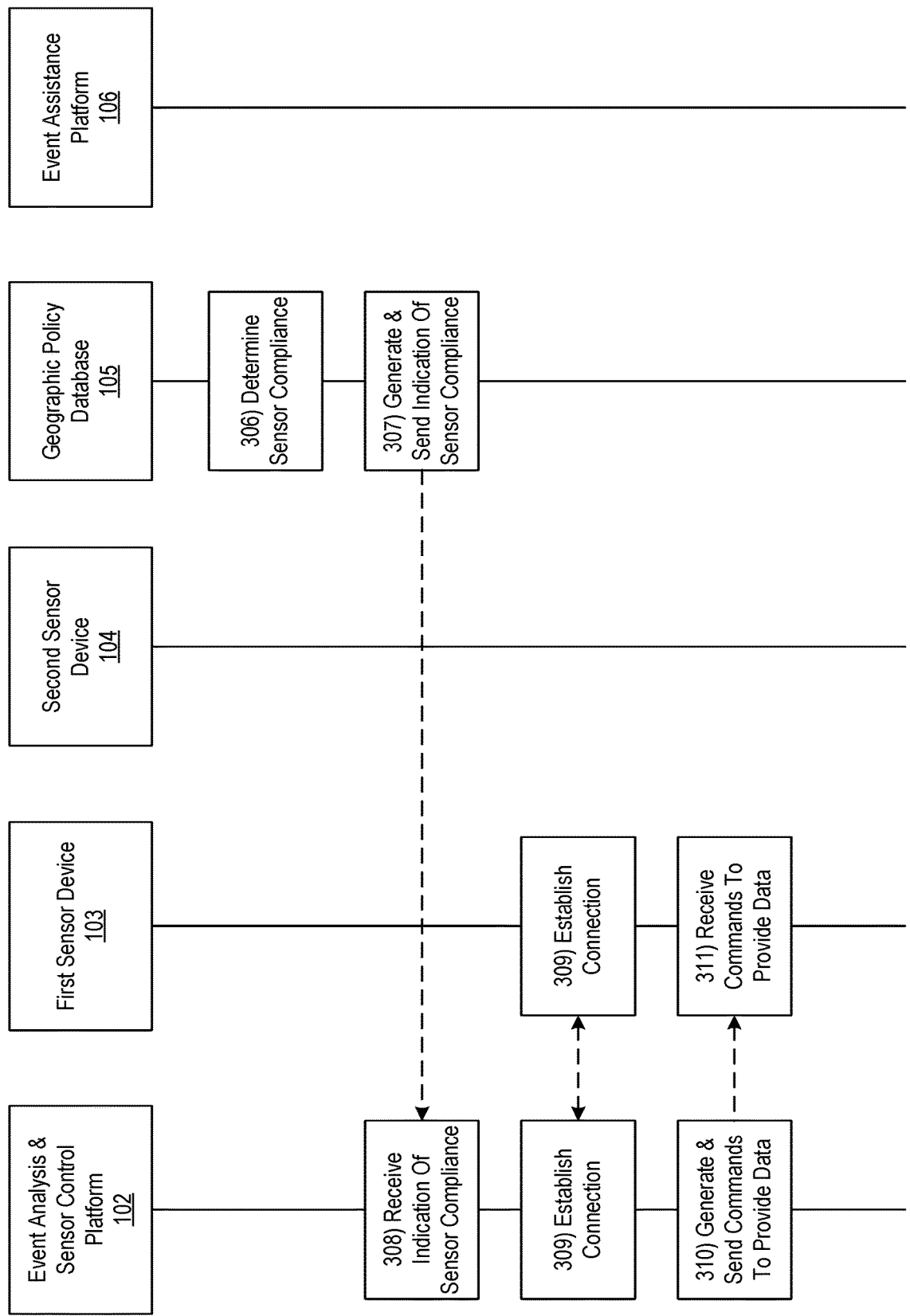

Referring to FIG. 3B, at step 306, the geographic policy database 105 may determine whether the requested sensor device is compliant with stored geographic policies. In one or more instances, the geographic policy database 105 may maintain a stored listing of which sensor devices are non-compliant with geographic policy. In these instances, the geographic policy database 105 may maintain a listing of sensor devices that are not permitted to collect particular source data in various regions (e.g., state, country, or the like). In these instances, the geographic policy database 105 may compare an identifier of the requested sensor device (e.g., serial number, device type, or the like) to the listing of non-permitted devices, and may determine if data collection via the requested sensor device complies with geographic policies associated with a location of the requested sensor device.

At step 307, the geographic policy database 105 may generate and send an indication of whether the requested sensor device complies with the geographic policies. In one or more instances, the geographic policy database may generate and send the indication of whether the requested sensor device complies with the geographic policies to the event analysis and sensor control platform 102 while the first wireless data connection is established.

At step 308, the event analysis and sensor control platform 102 may receive the indication of whether the requested sensor device complies with the geographic policies. In one or more instances, the event analysis and sensor control platform 102 may receive the indication of whether the requested sensor device complies with the geographic policies via the communication interface 113 and while the first wireless data connection is established. In some instances, the event analysis and sensor control platform 102 may determine, based on the indication of whether the requested sensor device complies with the geographic policies, that the requested sensor device does not comply with the geographic policies. In these instances, the event analysis and sensor control platform 102 may return to step 302 and determine the next most accurate sensor device on the ranked list of sensor devices for the particular data type. In other instances, the event analysis and sensor control platform 102 may determine, based on the indication of whether the requested sensor device complies with the geographic policies, that the requested sensor device does comply with the geographic policies. In these instances, the event analysis and sensor control platform 102 may proceed to step 309.

At step 309, the event analysis and sensor control platform 102 may establish a connection with the first sensor device 103. In these instances, the event analysis and sensor control platform 102 may have previously determined that the first sensor device 103 is the most accurate sensor device for collection of a particular data type that is compliant with geographic policies. In one or more instances, the event analysis and sensor control platform 102 may establish a second wireless data connection with the first sensor device 103 to link the event analysis and sensor control platform 102 to the first sensor device 103.

At step 310, the event analysis and sensor control platform 102 may generate and send one or more commands directing the first sensor device 103 to provide source data. In one or more instances, the event analysis and sensor control platform 102 may send the one or more commands to the first sensor device 103 to provide source data via the communication interface 113 and while the second wireless data connection is established. In these instances, sending the one or more commands directing the first sensor device 103 to provide the source data may be responsive to determining that the first sensor device complies with geographic policies based on the indication received at step 308.

At step 311, the event analysis and sensor control platform 102 may receive the one or more commands directing the first sensor device 103 to provide the source data. In one or more instances, the event analysis and sensor control platform 102 may receive the one or more commands directing the first sensor device 103 to provide the source data while the second wireless data connection is established.

Referring to FIG. 3C, at step 312, the first sensor device 103 may send source data to the event analysis and sensor control platform 102. In one or more instances, in sending the source data, the first sensor device 103 may send telematics data (e.g., acceleration, break detection, impact, or the like). Additionally or alternatively, the first sensor device 103 may send non-telematics data (e.g., user input, video, audio, images, or the like). In one or more instances, the first sensor device 103 may have previously collected the source data. In other instances, the first sensor device 103 might not have previously collected the source data, and may collect the source data in response to receiving the one or more commands directing the first sensor device 103 to provide the source data. In some instances, the first sensor device 103 may send only source data corresponding to the particular data type which the event analysis and sensor control platform 102 selected the first sensor device 103 to provide. In other instances, the first sensor device 103 may provide all of the collected source data, regardless of which source data it was selected to provide. In one or more instances, the first sensor device 103 may send the source data to the event analysis and sensor control platform 102 while the second wireless data connection is established.

At step 313, the event analysis and sensor control platform 102 may receive the source data from the first sensor device 103. In one or more instances, the event analysis and sensor control platform 102 may receive the source data from the first sensor device 103 via the communication interface 113 and while the second wireless data connection is established. In one or more instances, the event analysis and sensor control platform 102 may determine whether additional types of source data should be analyzed. If so, the event analysis and sensor control platform 102 may return to step 302 to determine a most accurate sensor device for collection of that type source data, and may proceed to determine whether such a sensor device is compliant with geographic policies in the manner described above. If not, the event analysis and sensor control platform 102 may proceed to step 314.

At step 314, the event analysis and sensor control platform 102 may establish a connection with the second sensor device 104. In these instances, the event analysis and sensor control platform 102 may have determined that a second type of source data should be analyzed, in addition to the source data received from the first sensor device 103. In these instances, the event analysis and sensor control platform 102 may have determined, via the steps described above, that the second sensor device 104 is the most accurate source of the second type of source data that is compliant with geographic policies. In one or more instances, the event analysis and sensor control platform 102 may establish a third wireless connection with the second sensor device 104 to link the event analysis and sensor control platform 102 to the second sensor device 104. In one or more instances, the event analysis and sensor control platform 102 may establish connections with multiple sensor devices at substantially the same time. In other instances, the event analysis and sensor control platform 102 may handle a single sensor device at a time.

At step 315, the event analysis and sensor control platform 102 may generate and send one or more commands directing the second sensor device 104 to provide source data. In one or more instances, the event analysis and sensor control platform 102 may send the one or more commands directing the second sensor device 104 to provide source data via the communication interface and while the third wireless data connection is established. In one or more instances, in generating the one or more commands directing the second sensor device 104 to provide source data, the event analysis and sensor control platform 102 may generate one or more commands directing the second sensor device 104 to provide different source data than was provided by the first sensor device 103.

At step 316, the second sensor device 104 may receive the one or more commands directing the second sensor device 104 to provide the source data. In these instances, the second sensor device may receive the one or more commands directing the second sensor device 104 to provide the source data while the third wireless data connection is established.

At step 317, the second sensor device 104 may send the source data requested at step 316. In one or more instances, in sending the source data, the second sensor device 104 may perform actions similar to those performed by the first sensor device 103 at step 312. However, in these instances, the second sensor device 104 may send different source data to the event analysis and sensor control platform 102 than was provided by the first sensor device. In one or more instances, the second sensor device may send the source data requested at step 316 while the third wireless data connection is established.

At step 318, the event analysis and sensor control platform 102 may receive the source data sent at step 317. In one or more instances, the event analysis and sensor control platform 102 may receive the source data via the communication interface 113 and while the third wireless data connection is established. In these instances, the event analysis and sensor control platform 102 may receive different source data than then source data received at step 313. For example, the event analysis and sensor control platform 102 may have received acceleration data from the first sensor device 103, but may receive brake detection data from the second sensor device 104. In some instances, steps 314 and 318 may occur at substantially the same time as steps 309-309. In other instances, they may occur at different times. Once the source data is received from the second sensor device 104, the event analysis and sensor control platform 102 may determine whether additional types of source data should be collected. If so, the event analysis and sensor control platform may return to step 302. If not, the event analysis and sensor control platform 102 may proceed to step 319.

Referring to FIG. 3D, at step 319, the event analysis and sensor control platform 102 may determine a location for event output processing. In these instances, the event analysis and sensor control platform 102 may determine whether event output processing should be performed at the event analysis and sensor control platform 102 or locally at one of the sensor devices. In some instances, the event analysis and sensor control platform 102 may make this determination based how urgently an event output should be determined. For example, if the source data received from the first sensor device 103 and second sensor device 104 does not exceed predetermined source data value thresholds, the event analysis and sensor control platform 102 may determine that an event, if one occurred, is not likely to need urgent attention. In these instances, the event analysis and sensor control platform 102 may determine that the extra time taken to perform the processing at the event analysis and sensor control platform 102 is negligible, and it may perform the processing (e.g., proceed to step 326). If the event analysis and sensor control platform 102 determines that one or more of the predetermined source data value thresholds are exceeded, the event analysis and sensor control platform 102 may determine that urgent processing should occur, and may proceed to step 320 to initiate local processing on one of the sensor devices. Available processing power at the local sensor devices may also be a factor in determination of the location for event output processing by the event analysis and sensor control platform 102. For example, the event analysis and sensor control platform 102 may determine available processing for the sensor devices and if available processing power does not exceed a predetermined processing threshold for any of the sensor devices, the event analysis and sensor control platform 102 may determine that it should perform the processing itself. If available processing power does exceed the predetermined processing threshold for one or more of the sensor devices, the event analysis and sensor control platform 102 might determine that processing should occur locally at one of the sensor devices.

At step 320, the event analysis and sensor control platform 102 may generate a ranked list of the sensor devices and their associated available processing power. In one or more instances, the event analysis and sensor control platform 102 may update the ranked list of sensor devices and their associated available processing power at predetermined interfaces, based on software updates, or the like. In the illustration shown in FIG. 3D, the event analysis and sensor control platform 102 may have determined that the first sensor device 103 had more available processing power than the second sensor device 104.

At step 321, the event analysis and sensor control platform 102 may generate and send one or more commands directing a sensor device, as reflected in the list at step 320 as having the highest amount of available processing power (e.g., in this illustration, first sensor device 103), to generate an event output. In these instances, the event analysis and sensor control platform 102 may send the one or more commands directing the first sensor device 103 to generate the event output via the communication interface 113 and while the second wireless data connection is established. In one or more instances, the event analysis and sensor control platform 102 may send the source data collected from all of the sensor devices to the first sensor device 103 for analysis.

At step 322, the first sensor device 103 may receive the one or more commands directing the first sensor device 103 to generate the event output. In one or more instances, the first sensor device 103 may receive the one or more commands directing the first sensor device 103 to generate the event output while the second wireless data connection is established.

At step 323, the first sensor device 103 may determine an event output. In determining the event output, the first sensor device 103 may determine an indication of whether an event occurred (a collision, sudden movement, harsh breaking, rollover, or the like) based on the source data received from the various data sources. In one or more instances, the first sensor device 103 may stich together the source data from the various data sources. Accordingly, the first sensor device 103 may compile the most accurate source data corresponding to each data type, thus resulting in the most accurate depiction of a potential event scenario (e.g., in contrast to merely receiving all of the source data from a particular sensor device regardless of that sensor device's ability to accurately collect and convey the source data). In one or more instances, the first sensor device 103 may compare the source data received to one or more machine learning datasets associated with events and non-events (e.g., a non-collision, or the like). In these instances, the machine learning datasets may indicate that particular combinations of source data are indicative of an event. In these instances, the first sensor device 103 may determine whether a comparison of the source data to one or more machine learning datasets indicative of an event exceeds a predetermined event threshold. If so, the first sensor device 103 may determine that an event occurred. If not, the first sensor device 103 may determine that an event did not occur.

Figure 3E:
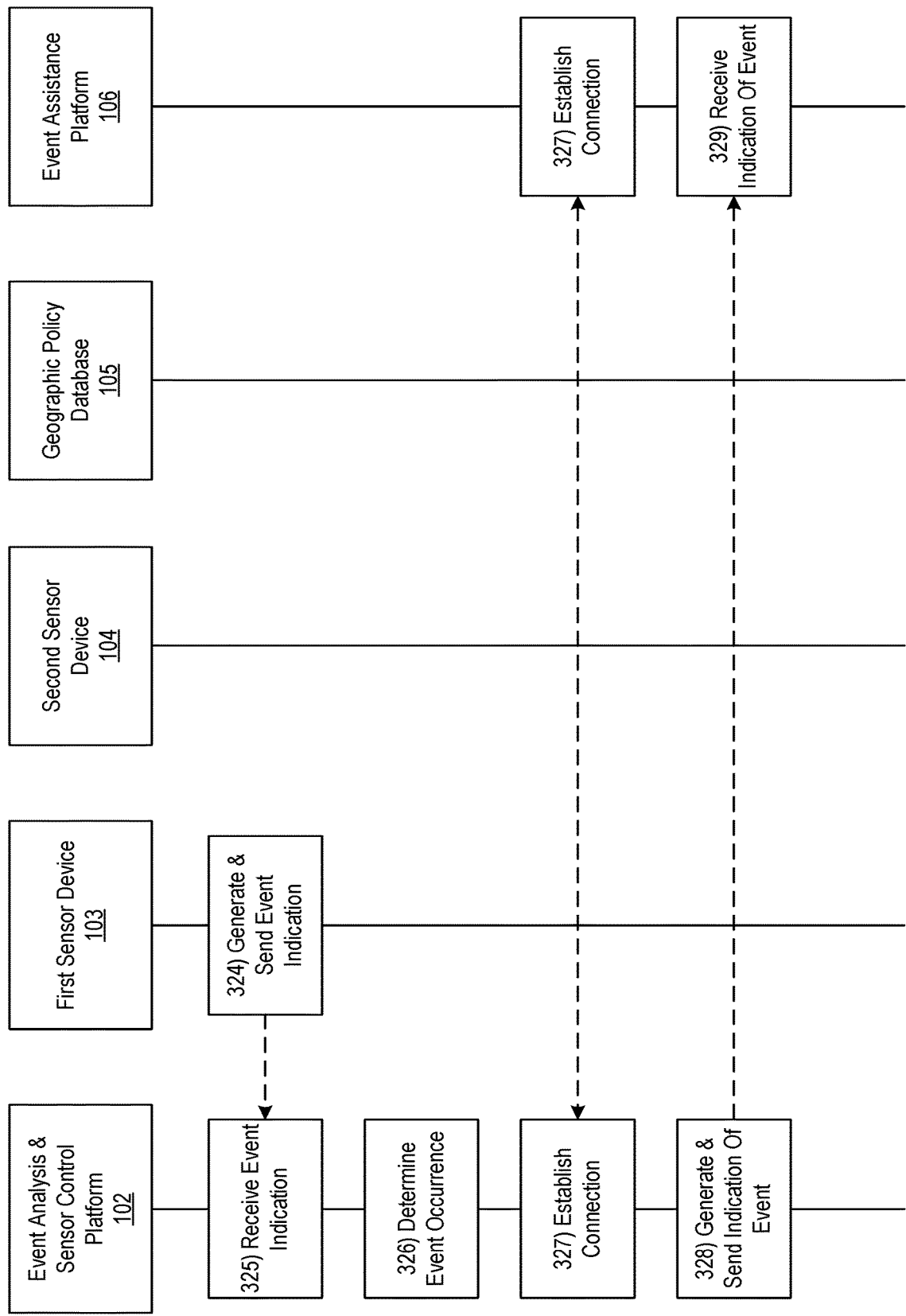

Referring to FIG. 3E, at step 324, the first sensor device 103 may generate and send an event indication based on the event output. In one or more instances, the first sensor device 103 may send the event indication while the second wireless data connection is established.

At step 325, the event analysis and sensor control platform 102 may receive the event indication send at step 324. In one or more instances, the event analysis and sensor control platform 102 may receive the event indication via the communication interface 113 and while the second wireless data connection is established.

At step 326, the event analysis and sensor control platform 102 may determine an event output. In some instances, the event output may have already been generated by the first sensor device 103. In these instances, the event analysis and sensor control platform 102 may derive the event output from the event indication. In other instances, the event analysis and sensor control platform 102 may have determined, at step 319, the processing should be performed by the event analysis and sensor control platform 102. In these instances, the event analysis and sensor control platform 102 may perform actions similar to those performed by the first sensor device 103 at step 323 to determine the event output.

At step 327, the event analysis and sensor control platform 102 may establish a connection with the event assistance platform 106. In one or more instances, the event analysis and sensor control platform 102 may establish a fourth wireless data connection with the event assistance platform 106 to link the event analysis and sensor control platform 102 to the event assistance platform 106.

At step 328, the event analysis and sensor control platform 102 may generate and send an indication of whether or not an event occurred. Actions performed at step 328 may be similar to those described above with regard to step 214. In one or more instances, the event analysis and sensor control platform 102 may send the indication of the event via the communication interface 113 and while the fourth wireless data connection is established.

At step 329, the event assistance platform 106 may receive the indication of the event. In one or more instances, the event assistance platform 106 may receive the indication of the event while the fourth wireless data connection is established. Actions performed at step 329 may be similar to those described above with regard to step 215.

Subsequently the event sequence may end. It should be understood that the methods described in FIGS. 3A-3E may be performed in addition to, or independently of, the methods described in FIGS. 2A-3C. It should also be understood that although the first sensor device 103 and the second sensor device 104 are shown, any number of sensor devices may be implemented in these methods.

Figure 4:
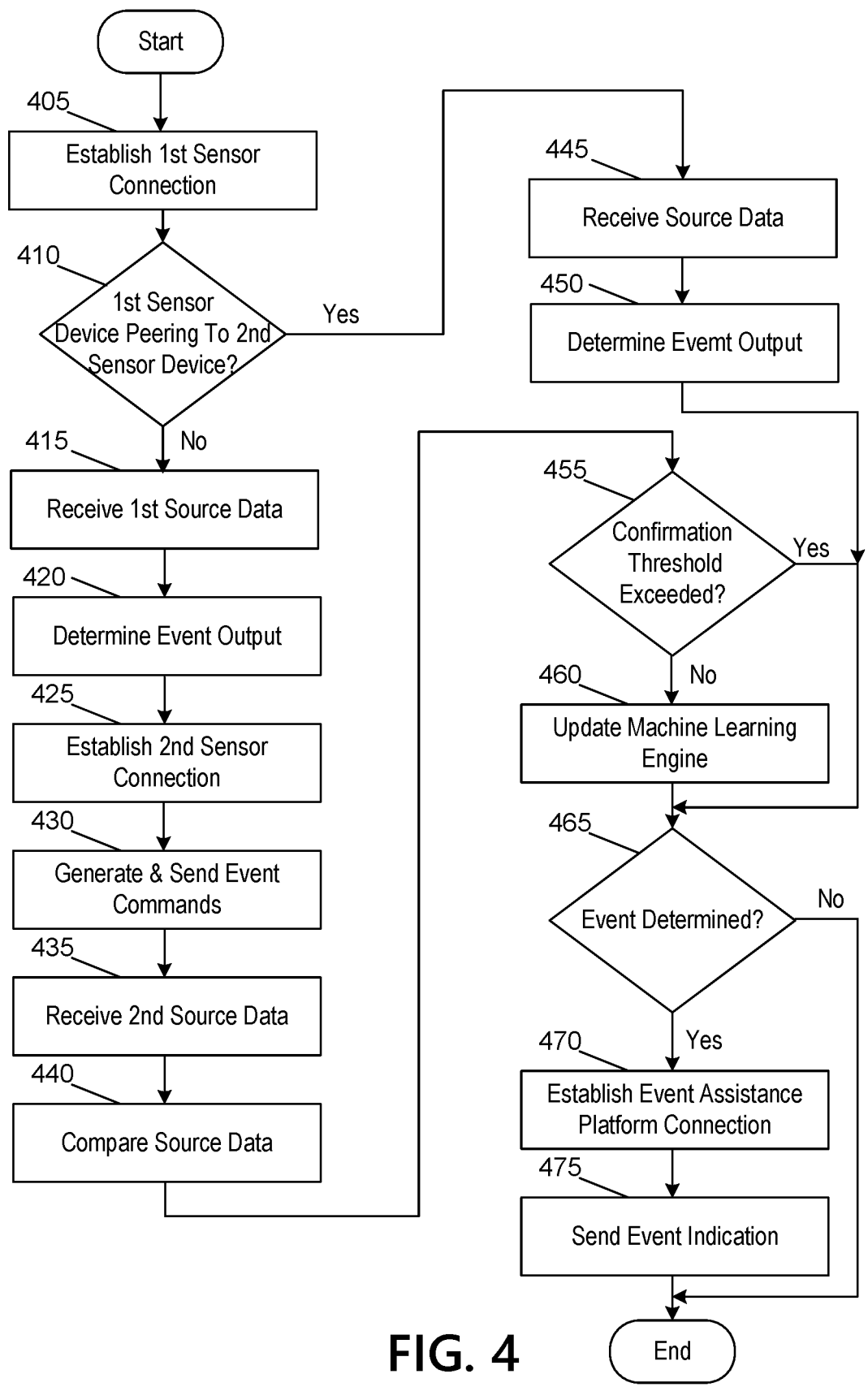
FIGS. 4 and 5 depict illustrative methods for deploying computing platforms that utilize improved event verification and sensor selection techniques in accordance with one or more example arrangements discussed herein.

FIG. 4 depicts an illustrative method for deploying an event analysis and sensor control platform 103 that uses advanced techniques to perform event analysis and sensor selection in accordance with one or more example embodiments. Referring to FIG. 4, at step 405, the computing platform may establish a connection to a first sensor device. At step 410, the computing platform may determine whether the first sensor device is peering directly to a second sensor device or whether the first sensor device is peering through the computing platform itself. If the first sensor device is peering directly to the second sensor device, the computing platform may proceed to step 445. If the first sensor device is peering through the computing platform, the computing platform may proceed to step 415.

At step 415, the computing platform may receive first source data from the first sensor device. At step 420, the computing platform may determine an event output based on the first source data. At step 425, the computing platform may establish a connection with a second sensor device. At step 430, the computing platform may generate and send one or more commands directing the second sensor device to confirm the event output. At step 435, the computing platform may receive second source data and/or a second event output. At step 440, the computing platform may compare the received second source data and/or second event output with the first source data and first event output. At step 455, the computing platform may determine whether a confirmation threshold was exceed based on the comparison at step 440. If the confirmation threshold was exceeded, the computing platform may proceed to step 465. If the confirmation threshold was not exceeded, the computing platform may proceed to step 460. At step 460, the confirmation threshold may update the machine learning engine used to determine the event output.

Returning to step 410, if the first sensor device is directly peering to the second sensor device, the computing platform may proceed to step 445. At step 445, the computing platform may receive source data from the first sensor device, the second sensor device, or both. At step 450, the computing platform may determine the event output based on the source data received at step 445.

At step 465, the computing platform may determine whether an event was determined based on the event output. If an event was determined, the computing platform may proceed to step 470. If an event was not determined, the method may end.

At step 470, the computing platform may establish a connection with an event assistance platform. At step 475, the computing platform may send an event indication to the event assistance platform.

Figure 5:
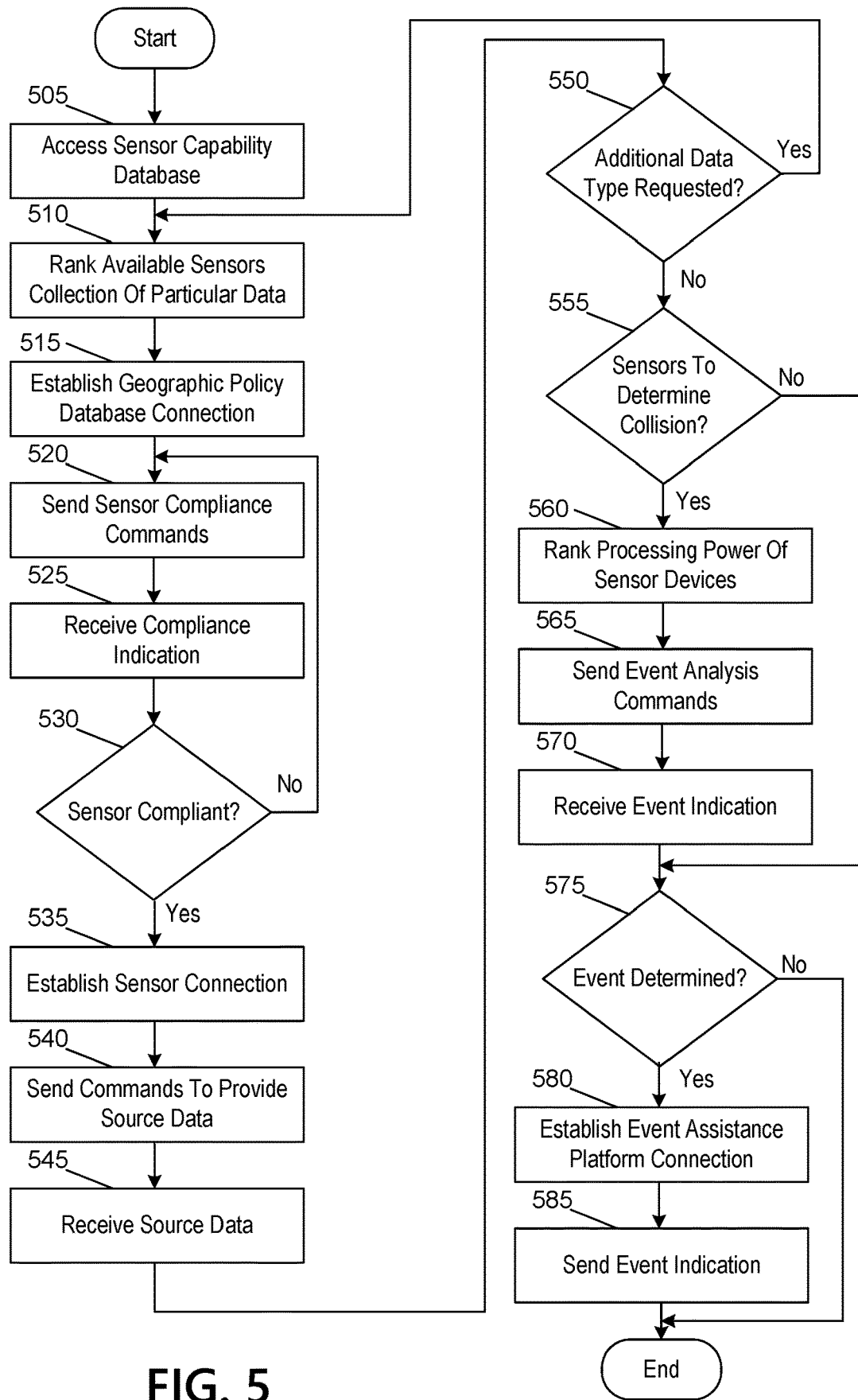

FIG. 5 depicts an illustrative method for deploying an event analysis and sensor control platform 103 that uses advanced techniques to perform event analysis and sensor selection in accordance with one or more example embodiments. At step 505, the computing platform may access a sensor capability database. At step 510, the computing platform may rank available sensor devices based on their capability to collect particular types of source data. At step 515, the computing platform may establish a connection with a geographic policy database. At step 520, the computing platform may send one or more commands directing the geographic policy database to determine whether a ranked sensor device is compliant with geographic policies. At step 525, the computing platform may receive an indication of whether or not the sensor device is compliant with the geographic policies. At step 530, the computing platform may determine, based on the indication of whether or not the sensor device is compliant with the geographic policies, whether the sensor device is compliant. If the sensor device is not compliant, the computing platform may return to step 520. If the sensor device is compliant, the computing platform may proceed to step 535.

At step 535, the computing platform may establish a connection with the sensor device. At step 540, the computing platform may send one or more commands directing the sensor device to provide source data. At step 545, the computing platform may receive the source data from the sensor device. At step 550, the computing platform may determine whether an additional data type is requested. If another data type is requested, the computing platform may return to step 510. If another data type is not requested, the computing platform may proceed to step 555.

At step 555, the computing platform may determine whether the sensor device is to determine an event or whether the computing platform is to make the determination. If the computing platform is to make that determination, the computing platform may proceed to step 575. If the sensor device is to make that determination, the computing platform may proceed to step 560. At step 560, the computing platform may rank the sensor devices based on their available processing power. At step 565, the computing platform may send one or more commands directing the highest ranked sensor device to determine whether an event occurred. At step 570, the computing platform may receive an event indication from the sensor device. At step 575, the computing platform may determine, based on the event indication, whether an event was determined. If so, the computing platform may proceed to step 580. If not, the method may end.

At step 580, the computing platform may establish a connection with an event assistance platform. At step 585, the computing platform may send an indication to the event assistance platform that an event occurred.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
access a sensor capability database to determine an accuracy output associated with each of a plurality of sensor devices for each of a plurality of data types;
rank, for each of the plurality of data types and based on accuracy outputs associated with the plurality of data types, the plurality of sensor devices under one or more specific conditions, resulting in one or more ranked lists of the plurality of sensor devices, the one or more ranked lists comprising a first ranking of one or more of the plurality of sensor devices based on accuracy outputs associated with acceleration data, the one or more ranked lists further comprising a second ranking of one or more of the plurality of sensor devices based on accuracy outputs associated with braking data;
send one or more commands directing a first sensor device to provide first source data;
receive, from the first sensor device, the first source data in response to the one or more commands;
generate, based on the first source data, an event output indicating whether a vehicle associated with the first source data experienced an event under a specific condition;
following the generation of the event output indicating an event has occurred, establish a connection to a second sensor device that has already collected at least a portion of a second source data, the second sensor device being selected based on a corresponding accuracy output for the specific condition;
send one or more commands directing the second sensor device to provide the second source data, wherein the first sensor device is ranked highest on one of either the first ranking that is based on accuracy outputs associated with acceleration data or the second ranking that is based on accuracy outputs associated with braking data, and wherein the second sensor device is ranked highest on the other of the first ranking that is based on accuracy outputs associated with acceleration data or the second ranking that is based on accuracy outputs associated with braking data;

receive, from the second sensor device, the second source data in response to the one or more commands directing the second sensor device to provide the second source data; and confirm, based on the second source data, the event output by comparing the first source data and the second source data.

2. The computing platform of claim 1, wherein the memory stores additional computer-readable instructions that, when executed by the at least one processor, further cause the computing platform to:

establish a wireless connection with a geographic policy database;

send, while the wireless connection is established and after ranking the plurality of sensor devices, one or more commands directing the geographic policy database to provide an indication of whether use of the first sensor device complies with geographic policies; and receive, while the wireless connection is established, the indication of whether use of the first sensor device complies with geographic policies.

3. The computing platform of claim 2, wherein sending the one or more commands directing the first sensor device to provide first source data is in response to determining, based on the indication of whether the use of the first sensor device complies with geographic policies, that the first sensor device complies with geographic policies.

4. The computing platform of claim 2, wherein the memory stores additional computer-readable instructions that, when executed by the at least one processor, further cause the computing platform to:

send, while the wireless connection is established and after ranking the plurality of sensor devices, one or more commands directing the geographic policy database to provide an indication of whether use of a third sensor device complies with geographic policies, wherein the third sensor device is ranked highest on a third ranking of the one or more ranked lists, the third ranking being based on accuracy outputs associated with a data type corresponding to third source data;

receive, while the wireless connection is established, the indication of whether use of the third sensor device complies with geographic policies;

determine, based on the indication of whether use of the third sensor device complies with geographic policies, that the third sensor device is non-compliant with the geographic policies;

send, after determining that the third sensor device is non-compliant with the geographic policies, one or more commands directing the geographic policy database to provide an indication of whether use of a fourth sensor device complies with geographic policies, wherein the fourth sensor device is ranked second highest on the third ranking of the one or more ranked lists; and send, in response to determining, based on the indication of whether the use of the fourth sensor device complies with geographic policies, that the fourth sensor device complies with geographic policies, one or more commands directing the fourth sensor device to provide the third source data.

5. The computing platform of claim 2, wherein the memory stores additional computer-readable instructions that, when executed by the at least one processor, further cause the computing platform to:

determine that event analysis should occur locally at one of the plurality of sensor devices;

rank the plurality of sensor devices based on available processing power at each of the plurality of sensor devices, resulting in a ranked list of sensor devices by processing power; and send one or more commands to the first sensor device directing the first sensor device to determine the event output, wherein the first sensor device is a highest ranked device on the ranked list of sensor devices by processing power.

6. The computing platform of claim 2, wherein the memory stores additional computer-readable instructions that, when executed by the at least one processor, further cause the computing platform to determine that event analysis should occur at the computing platform.

7. The computing platform of claim 6, wherein the memory stores additional computer-readable instructions that, when executed by the at least one processor, further cause the computing platform to determine the event output in response to determining that the event analysis should occur at the computing platform.

8. The computing platform of claim 7, wherein the memory stores additional computer-readable instructions that, when executed by the at least one processor, further cause the computing platform to determine, using one or more machine learning algorithms and one or more machine learning datasets, an indication of whether the vehicle experienced the event.

9. The computing platform of claim 1, wherein the memory stores additional computer-readable instructions that, when executed by the at least one processor, further cause the computing platform to:

establish a wireless connection with an event assistance platform; and send, while the wireless connection is established and to the event assistance platform, the event output and one or more commands directing the event assistance platform to cause display of the event output.

10. A method comprising:

at a computing platform comprising at least one processor, a communication interface, and memory:

accessing a sensor capability database to determine an accuracy output associated with each of a plurality of sensor devices for each of a plurality of data types;

ranking, for each of the plurality of data types and based on accuracy outputs associated with the plurality of data types, the plurality of sensor devices under one or more specific conditions, resulting in one or more ranked lists of the plurality of sensor devices, the one or more ranked lists comprising a first ranking of one or more of the plurality of sensor devices based on accuracy outputs associated with acceleration data, the one or more ranked lists further comprising a second ranking of one or more of the plurality of sensor devices based on accuracy outputs associated with braking data;

sending one or more commands directing a first sensor device to provide first source data;

receiving, from the first sensor device, the first source data in response to the one or more commands;

generating, based on the first source data, an event output indicating whether a vehicle associated with the first source data experienced an event under a specific condition;

following the generation of the event output indicating an event has occurred, establishing a connection to a second sensor device that has already collected at least a portion of a second source data, the second sensor device being selected based on a corresponding accuracy output for the specific condition;

sending one or more commands directing the second sensor device to provide the second source data, wherein the first sensor device is ranked highest on one of either the first ranking that is based on accuracy outputs associated with acceleration data or the second ranking that is based on accuracy outputs associated with braking data, and wherein the second sensor device is ranked highest on the other of the first ranking that is based on accuracy outputs associated with acceleration data or the second ranking that is based on accuracy outputs associated with braking data;

receiving, from the second sensor device, the second source data in response to the one or more commands directing the second sensor device to provide the second source data; and confirming, based on the first source data and the second source data, the first source data based on comparison of the first source data and the second source data.

11. The method of claim 10, further comprising:
establishing a wireless connection with a geographic policy database;
sending, while the wireless connection is established and after ranking the plurality of sensor devices, one or more commands directing the geographic policy database to provide an indication of whether use of the first sensor device complies with geographic policies; and
receiving, while the wireless connection is established, the indication of whether use of the first sensor device complies with geographic policies.

12. The method of claim 11, wherein sending the one or more commands directing the first sensor device to provide first source data is in response to determining, based on the indication of whether the use of the first sensor device complies with geographic policies, that the first sensor device complies with geographic policies.

13. The method of claim 11, further comprising:
sending, while the wireless connection is established and after ranking the plurality of sensor devices, one or more commands directing the geographic policy database to provide an indication of whether use of a third sensor device complies with geographic policies, wherein the third sensor device is ranked highest on a third ranking of the one or more ranked lists, the third ranking being based on accuracy outputs associated with a data type corresponding to third source data;
receiving, while the wireless connection is established, the indication of whether use of the third sensor device complies with geographic policies;
determining, based on the indication of whether use of the third sensor device complies with geographic policies, that the third sensor device is non-compliant with the geographic policies;

sending, after determining that the third sensor device is non-compliant with the geographic policies, one or more commands directing the geographic policy database to provide an indication of whether use of a fourth sensor device complies with geographic policies, wherein the fourth sensor device is ranked second highest on the third ranking of the one or more ranked lists; and
sending, in response to determining, based on the indication of whether the use of the fourth sensor device complies with geographic policies, that the fourth sensor device complies with geographic policies, one or more commands directing the fourth sensor device to provide the third source data.

14. The method of claim 11, further comprising:
determining that event analysis should occur locally at one of the plurality of sensor devices;
ranking the plurality of sensor devices based on available processing power at each of the plurality of sensor devices, resulting in a ranked list of sensor devices by processing power; and
sending one or more commands to the first sensor device directing the first sensor device to determine the event output, wherein the first sensor device is a highest ranked device on the ranked list of sensor devices by processing power.

15. The method of claim 11, further comprising determining that event analysis should occur at the computing platform.

16. The method of claim 15, wherein the determining the event output is in response to determining that the event analysis should occur at the computing platform.

17. The method of claim 16, wherein determining the event output comprises determining, using one or more machine learning algorithms and one or more machine learning datasets, an indication of whether the vehicle experienced an event.

18. The method of claim 10, further comprising:
establishing a wireless connection with an event assistance platform; and
sending, while the wireless connection is established and to the event assistance platform, the event output and one or more commands directing the event assistance platform to cause display of the event output.

19. One or more non-transitory computer-readable media storing instructions that, when executed by a computing platform comprising at least one processor, a communication interface, and memory, cause the computing platform to:
access a sensor capability database to determine an accuracy output associated with each of a plurality of sensor devices for each of a plurality of data types;
rank, for each of the plurality of data types and based on accuracy outputs associated with the plurality of data types, the plurality of sensor devices under one or more specific conditions, resulting in one or more ranked lists of the plurality of sensor devices, the one or more ranked lists comprising a first ranking of one or more of the plurality of sensor devices based on accuracy outputs associated with acceleration data, the one or more ranked lists further comprising a second ranking of one or more of the plurality of sensor devices based on accuracy outputs associated with braking data;
send one or more commands directing a first sensor device to provide first source data;
receive, from the first sensor device, the first source data in response to the one or more commands;

generate, based on the first source data, an event output indicating whether a vehicle associated with the first source data experienced an event under a specific condition;

following the generation of the event output indicating an event has occurred, establish a connection to a second sensor device that has already collected at least a portion of a second source data, the second sensor device being selected based on a corresponding accuracy output for the specific condition;

sending one or more commands directing the second sensor device to provide the second source data, wherein the first sensor device is ranked highest on one of either the first ranking that is based on accuracy outputs associated with acceleration data or the second ranking that is based on accuracy outputs associated with braking data, and wherein the second sensor device is ranked highest on the other of the first ranking that is based on accuracy outputs associated with acceleration data or the second ranking that is based on accuracy outputs associated with braking data;

receive, from the second sensor device, the first source data and the second source data; and confirm, based on the second source data, the event output by comparing the first source data and the second source data.

20. The one or more non-transitory computer-readable media of claim 19, wherein the non-transitory computer-readable media stores additional instructions that, when executed by the computing platform, cause the computing platform to:

establish a wireless connection with a geographic policy database;

send, while the wireless connection is established and after ranking the plurality of sensor devices, one or more commands directing the geographic policy database to provide an indication of whether use of the first sensor device complies with geographic policies; and receive, while the wireless connection is established, the indication of whether use of the first sensor device complies with geographic policies.

* * * * *